United States Patent [19]

Conway

[11] Patent Number: 4,693,607

[45] Date of Patent: Sep. 15, 1987

[54] METHOD AND APPARATUS FOR OPTICALLY MEASURING THE VOLUME OF GENERALLY SPHERICAL FRUIT

[75] Inventor: Tim D. Conway, Stockton, Calif.

[73] Assignee: Sunkist Growers Inc., Ontario, Calif.

[21] Appl. No.: 862,126

[22] Filed: May 12, 1986

Related U.S. Application Data

[63] Continuation-in-part of Ser. No. 558,312, Dec. 5, 1983, abandoned.

[51] Int. Cl.[4] .............................................. G01B 11/28
[52] U.S. Cl. ..................................... 356/380; 209/586; 209/587
[58] Field of Search ............... 356/379, 380, 383, 384, 356/385, 386, 387; 209/586, 587

[56] References Cited

U.S. PATENT DOCUMENTS

| | | | |
|---|---|---|---|
| 3,513,444 | 5/1970 | Henderson et al. | 356/379 X |
| 4,120,402 | 10/1978 | Swanson | 209/587 X |
| 4,120,403 | 10/1978 | Stephanos | 356/383 X |
| 4,205,973 | 6/1980 | Ryan | 356/380 X |
| 4,324,335 | 4/1982 | Conway et al. | 356/380 X |
| 4,417,817 | 11/1983 | Böhme et al. | 356/380 |

Primary Examiner—F. L. Evans

Attorney, Agent, or Firm—Pretty, Schroeder, Brueggemann & Clark

[57] ABSTRACT

A method and apparatus for optically measuring the volume of a succession of individual, generally spherical fruit, each located in a separate receptacle of a conveyor. A pair of linear, coplanar arrays of phototransducers are arranged to view a narrow examining region from orthogonal directions as the conveyor moves the fruit through it, and each array is read at regular intervals of time to produce a plurality of pairs of orthogonal width measurements for each fruit, each pair of measurements corresponding to a separate narrow cross section of the fruit. A microprocessor multiplies together each measurement pair and sums together the successive products to produce a measure of the fruit's volume. In addition, the microprocessor compares the maximum width measurement for each fruit with a count of the number of cross sections for the fruit, to ensure that the volume measurement is based on just a single item of fruit. The microprocessor also eliminates the effect of any light-reflecting debris in the receptacle adjacent to the fruit by detecting certain characteristic patterns in the signals derived from the two phototransducer arrays and substituting predetermined width estimates when those patterns are detected.

38 Claims, 13 Drawing Figures

METHOD AND APPARATUS FOR OPTICALLY MEASURING THE VOLUME OF GENERALLY SPHERICAL FRUIT

CROSS-REFERENCE TO RELATED APPLICATION

This is a continuation-in-part of Ser. No. 558,312, filed Dec. 5, 1983, now abandoned.

BACKGROUND OF THE INVENTION

This invention relates generally to apparatus for sorting fruit, and, more particularly, to apparatus for optically measuring the volume of individual, generally spherical fruit.

The ability to sort fresh fruit according to its volume is essential to the fresh fruit industry. In particular, since spherical fruit, such as oranges and grapefruit, are frequently sold in cartons having a fixed interior volume, it is important that each carton be filled with fruit of a consistent volume. Excessive fruit volume variation can prevent the carton from meeting legal size standards. In addition, sales of the fruit can be affected adversely if the cartons suffer from any of the following three appearance problems. The carton can be a "slack pack", where the average size of the fruit in the carton is too small, a "high pack", where the average size of the fruit is too large, thereby causing fruit compression, splitting, and excessive decay, or a "variable pack", where the average size of the fruit varies excessively.

Initially, the sorting of fruit by volume was performed by manual human labor. In addition to being a slow and costly process, manual sorting has proven to be inaccurate in that the workers' assessments are highly subjective, varying both with time and from worker to worker. As a result, substantial effort has been expended to automate the sorting process.

Mechanical sizers have been used for many years to measure the volume of generally spherical fruit. Such sizers typically include a series of spaced, parallel rollers, each containing a number of four-point contact rubber grommets. Unfortunately, the sizers are completely accurate only when the fruit are perfectly spherical. If the fruit have an irregular shape, they frequently are not oriented effectively in the four point grommet and an inaccurate volume measurement results.

Another drawback to mechanical sizers is their relative high cost. Since the demand for sizing apparatus is very limited, and since mechanical sizers typically require many specialized parts not otherwise manufactured in voluem, they tend to be very costly. Maintenance costs are also high.

Optical sizing apparatus can be substantially less expensive and more accurate than mechanical sizers. Such optical apparatus have been used in the past to measure the height and width of a succession of parallel slices or cross-sections of an article as it is moved through an examining region. These heights and width measurements are then used to produce a measure of the article's total volume. However, such apparatus are not entirely suitable for use in measuring the volume of fruit. This is especially the case when reflective debris is also present in the examining region, or when non-reflecting blemishes are present on the skin of the fruit.

It will be appreciated from the foregoing that there is a need for an optical apparatus for more accurately measuring the volume of individual spherical fruit even in the presence of light-reflecting objects adjacent to the fruit or blemishes on the skin of the fruit. The present invention fulfills this need.

SUMMARY OF THE INVENTION

The present invention is embodied in an optical measuring apparatus, and related method, for accurately and reliably measuring the volume of generally spherical fruit, by detecting and correcting for foreign light-reflecting objects adjacent to the fruit and for non-reflecting blemishes on the skin of the fruit. The apparatus is substantially less expensive than conventional mechanical fruit sizers, yet it measures fruit volume wih very high accuracy. The apparatus includes width measuring means for measuring the width of a number of narrow, substantially parallel cross sections of the fruit, to produce a set of width measurements, along with volume calculating means for calculating the volume of the fruit in accordance with the set of width measurements. These measurements can be inaccurate if light-reflecting debris or additional fruit are present in a receptacle carrying the fruit, or in non-reflecting blemishes are present on the skin of the fruit.

In accordance with one aspect of the invention, the apparatus detects the presence of more than one fruit in the receptacle using selecting means for selecting the largest measurement from the set of width measurements, along with length measuring means for determining the length of the fruit in the receptacle by counting the number of parallel cross sections. In addition, means are included for determining the ratio of the maximum width and the length and for comparing this ratio with one or more predetermined thresholds. Depending on the outcome of the comparison, the apparatus determines whether or not more than one fruit is in the receptacle. More than one fruit in the receptacle can further be detected by comparing each width measurement with the measurement for an adjacent cross section, to determine if any of the compared measurements differ from each other by more than a predetermined amount. If more than one fruit is detected, a flag is raised to indicate that the corresponding volume calculation should be disregarded.

More particularly, the apparatus of the invention is adapted for use in measuring the volume of a succession of fruit, each located in a separate receptacle on a conveyor. The width measuring means includes a pair of fixed, coplanar, linear arrays of phototransducers, oriented to view the fruit-containing receptacles from orthogonal directions as they move past. At any one time, the number of phototransducers in each array viewing a portion of the fruit, as contrasted with the non-reflecting receptacle, is a measure of the width of a narrow cross section of the fruit then within their field of view. The width measuring means periodically reads out the light intensity measurements serially from the separate phototransducers of the two arrays, as the conveyor moves the fruit past them, and it compares these successive measurements with a predetermined light intensity threshold, to produce a plurality of pairs of orthogonal width measurements for each fruit. The volume calculating means multiplies together the successive pairs of width measurements, to produce measurements of the area, and thus volume, of the successive fruit cross sections, and it sums together these products to produce a measure of the fruit's volume.

When more than one item of fruit happens to be in any one receptacle, the maximum width measurement from the two phototransducer arrays will ordinarily differ considerably from the maximum length measurement. The selecting means selects the particular measurement from either of the two arrays that is the largest and computes the ratio of it and the length measurement. The ratio means compares this ratio with predetermined upper and lower thresholds, and if the ratio does not lie between the two, it determines that more than one item of fruit is present in the receptacle. It then raises a flag to indicate that the corresponding volume measurement should be disregarded.

In another aspect of the invention, the apparatus corrects for the effects of light-reflecting debris on the receptacle adjacent to the fruit and for the effects of non-reflecting blemishes on the fruit itself. This is accomplished using detection means for suitably processing the successive width measurements to detect certain characteristic patterns that indicate such occurrences and for then substituting more reliable estimates of widths. In particular, the detection means estimates an expected value for each width measurement based on one or more adjacent width measurements, and it compares this estimate with the actually-measured width whenever there is a discontinuity in the serial output signal produced by each phototransducer array. If the measured width measurement exceeds the estimated width by more than a predetermined amount, the detection means deduces that the measured width is based, in part, on light-reflecting debris adjacent to the fruit, and it substitutes the estimated width. Otherwise, it uses the measured width for subsequent computations. The estimated width is preferably based on a linear extrapolation of the width measurements for two adjacent cross sections.

Other aspects and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
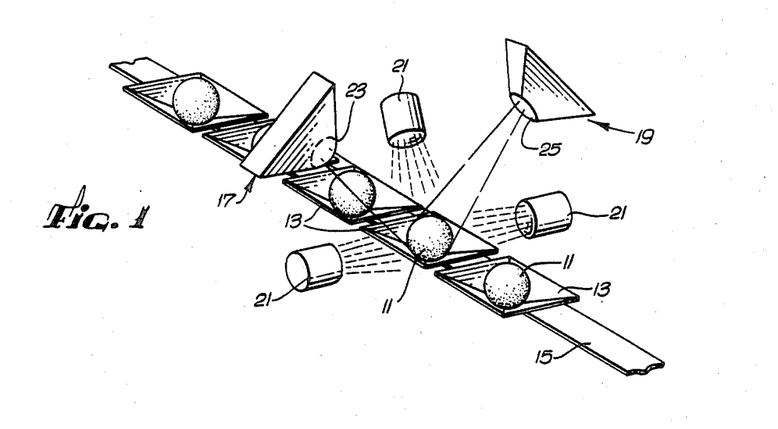
FIG. 1 is a perspective view of a conveyor and sensor portion of an optical measuring apparatus for measuring the volume of a succession of individual, generally spherical fruit.
Figure 2:
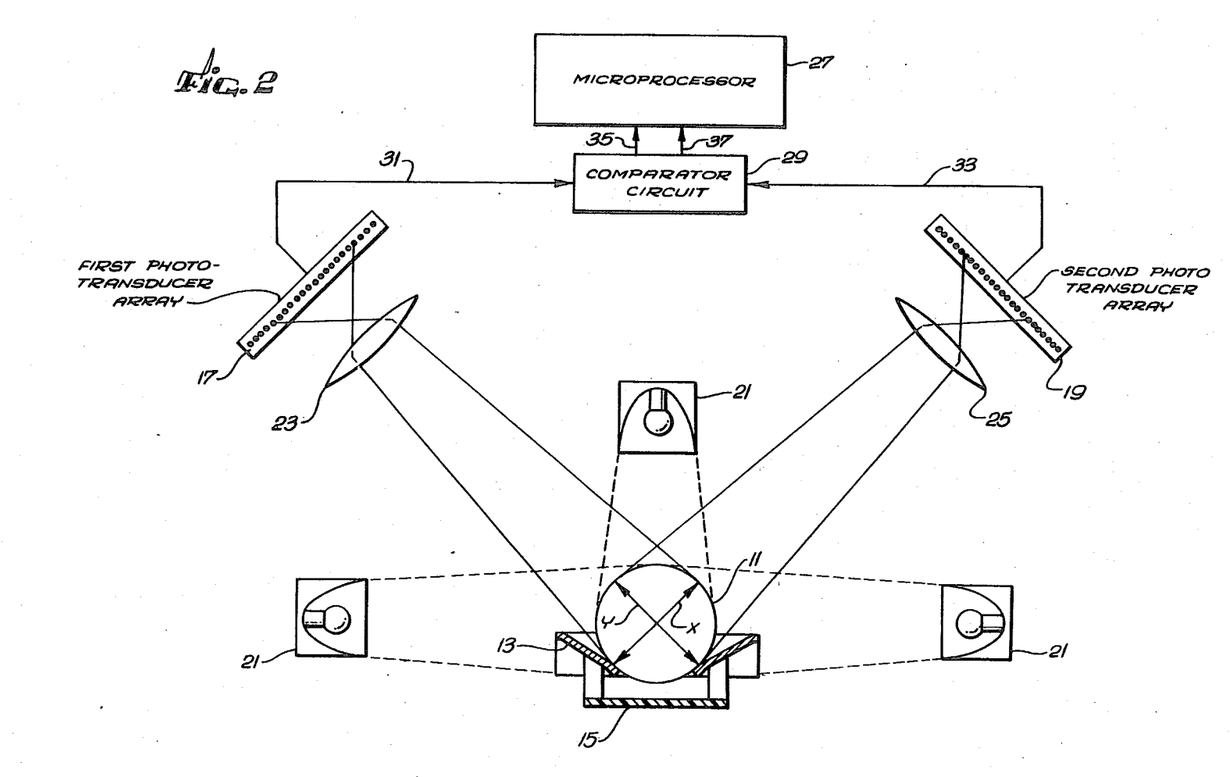
FIG. 2 is a schematic end view of the apparatus of FIG. 1, depicting a pair of phototransducer arrays for measuring the width of a fruit along two orthogonal axes, as the conveyor moves the fruit past the arrays.

Referring now to the drawings, and particularly to FIGS. 1 and 2, there is shown an optical apparatus for measuring the volume of a succession of individual, generally spherical fruit 11 carried in a series of receptacles 13 on a conveyor 15. The apparatus includes first and second fixed phototransducer arrays 17 and 19, respectively, oriented to view a narrow examining region through which the successive fruit-containing receptacles pass. A plurality of lamps 21 illuminate the examining region, and light reflected by the fruit as it moves through the region is focused onto the two phototransducer arrays by lenses 23 and 25. Each phototransducer array includes a linear array of contiguous photodiodes, and the two arrays are oriented in a coplanar relationship to view the narrow examining region along orthogonal axes, each at about 45 degrees with respect to horizontal. At any one time, the number of photodiodes in each array that view a portion of the fruit, as contrasted with the adjacent receptacle carrying it, is a measure of the width of a narrow slice or cross section of the fruit. A microprocessor 27 and comparator circuit 29 periodically read out and suitably process the light-intensity signals produced by the two arrays, to produce a succession of width measurement pairs for each fruit, each such pair representing the widths along orthogonal axes of a separate cross section of the fruit. The microprocessor, in turn, uses these width measurements to derive an accurate measurement of the fruit's volume.

Figure 3:
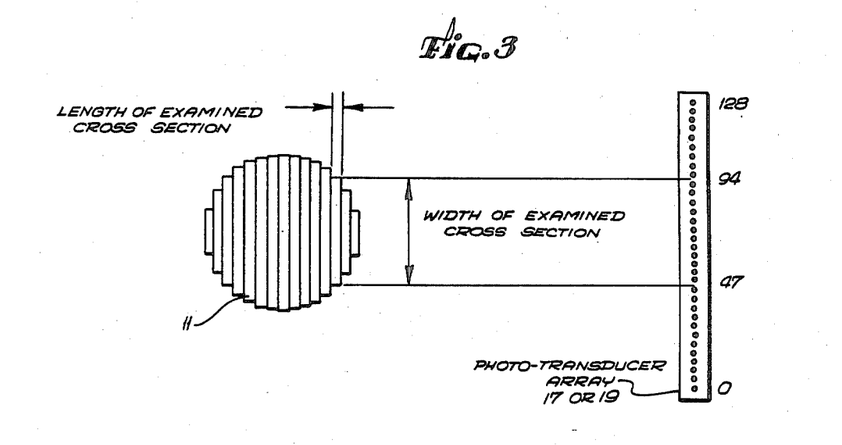
FIG. 3 is a schematic view depicting one of the two phototransducer arrays measuring the widths of a number of narrow cross sections of the fruit.

FIG. 3 is a schematic depiction of one scan of the fruit 11 by the first phototransducer array 17. The array is shown to include 128 contiguous photodiodes, numbered 1 through 128, although it will of course be appreciated that many other resolutions could likewise be used. Each photodiode has a unique, non-overlapping field of view and produces an electrical current proportional to the intensity of any light incident on it. The two arrays 17 and 19 and their corresponding lenses 23 and 25 are configured such that each array views the entire receptacle 13, whereby the apparatus can properly measure the largest fruit expected.

For the particular scan shown in FIG. 3, photodiode numbers 47–94 are positioned to view the fruit 11, while the remaining photodiodes view the receptacle 13 carrying the fruit. The receptacle is painted in a non-reflective black color, so that the photodiodes that view it will receive very little light and thus produce relatively low-level signals.

Figure 4:
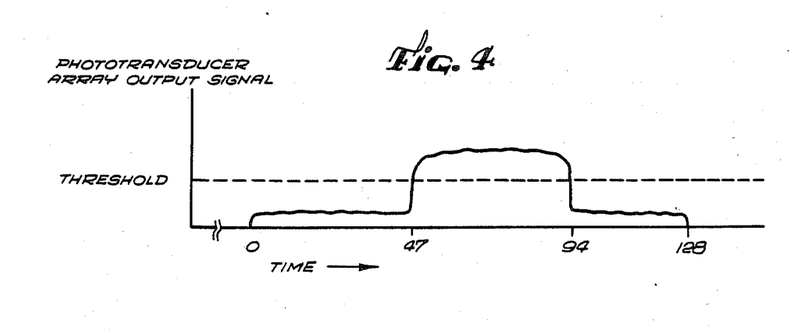
FIG. 4 is a graph depicting the serial output signal produced by the phototransducer array of FIG. 3 when it scans the particular cross section of the fruit shown.

When the microprocessor 27 serially reads out the successive photodiodes in the array 17, it produces an analog phototransducer signal, such as that shown in FIG. 4. As shown in FIG. 2, this signal, and a similar one produced by the second array 19, are coupled on lines 31 and 33, respectively, to the comparator circuit 29, which compares the signals with a predetermined threshold and produces corresponding digital signals for coupling on lines 35 and 37 to the microprocessor. In the case of the scan depicted schematically in FIG. 3, this digital signal is in a logical one state during the periods corresponding to the photodiode numbers 47–94, and in the logical zero state during all of the remaining periods.

Figure 5:
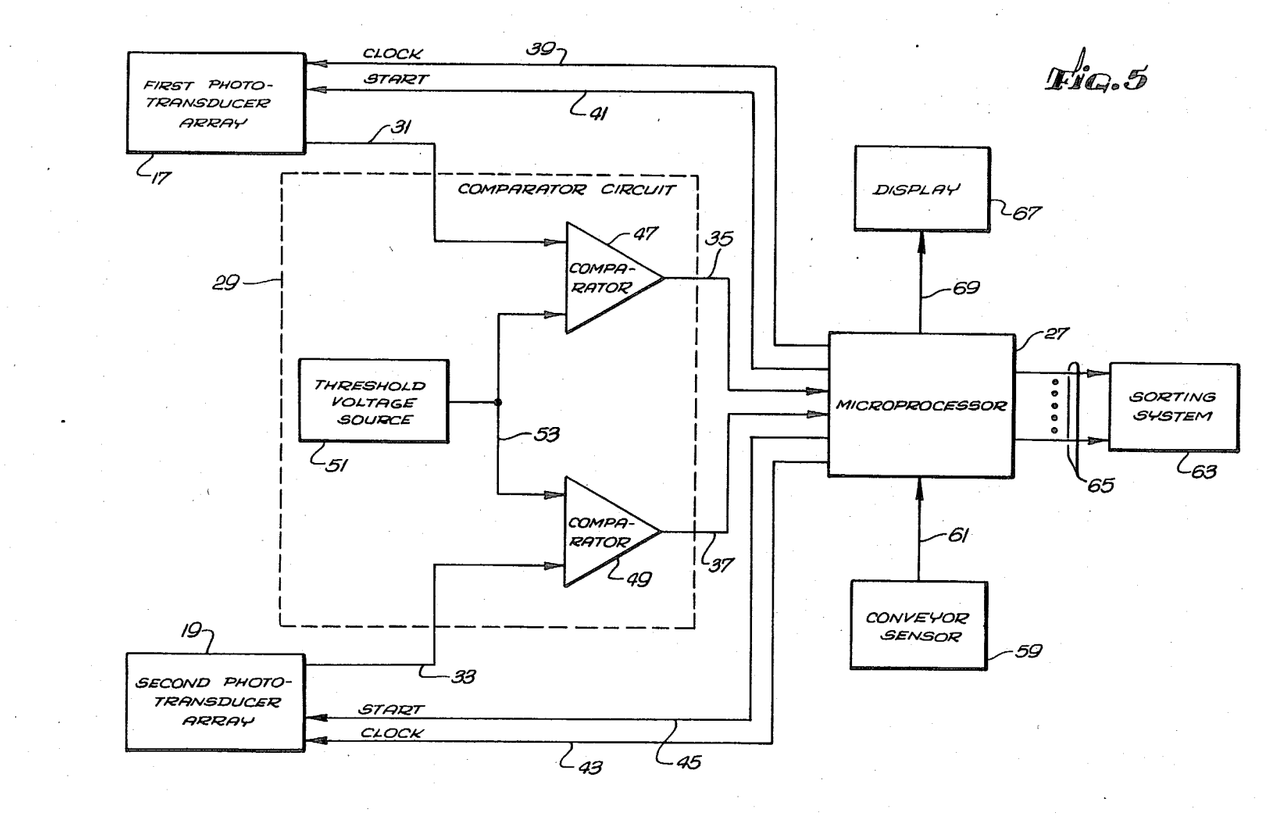
FIG. 5 is a schematic block diagram of the portion of the apparatus of FIG. 1 that processes the signals produced by the two phototransducer arrays, to determine the volume of each successive fruit.

FIG. 5 more particularly depicts the interface between the microprocessor 27 and comparator circuit 29 and the respective first and second phototransducer arrays 17 and 19. The microprocessor reads out each array using a conventional clock signal and start signal, one pair of which is coupled on lines 39 and 41 to the first array and the other pair of which is coupled on lines 43 and 45 to the second array. The resulting analog phototransducer signals are coupled on lines 31 and 33 to the comparator circuit, which compares them with the predetermined threshold voltage. In particular, the comparator circuit includes a first comparator 47 for comparing the first phototransducer signal with the threshold voltage and a second comparator 49 for comparing the second phototransducer signal with the threshold voltage. The threshold voltage is produced by a threshold voltage source 51, and it is coupled to the respective first and second comparators on line 53. The resulting digital output signals produced by the first and second comparators are coupled on lines 35 and 37, respectively, to the microprocessor 27, for further processing, as will be described below.

The apparatus further includes a conveyor sensor 59 for use in producing a signal indicating the rate of movement of the conveyor 15. This signal is coupled on line 61 to the microprocessor 27, which produces the clock and start signals for the phototransducer arrays 17 and 19 at a corresponding rate. This guarantees that the conveyor will have moved by a predetermined, constant amount each time the microprocessor reads out the two arrays, whereby the successive cross sections of the fruit 11 will all have substantially the same thickness or length.

The microprocessor 27 suitably processes the successive digitized phototransducer signals supplied to it on lines 35 and 37, to measure the volume of the fruit 11 in each receptacle 13. In particular, it measures the time duration of each signal by subtracting the number of the first photodiode that provides a logical one signal value from the number of the last photodiode that provides a logical one signal value, the result being a photodiode width that is a digital measure of the fruit's width for one scan. Thus, the photodiode width for the scan depicted schematically in FIGS. 3 and 4 would be 47.

After determining the photodiode widths for each of the two phototransducer arrays 17 and 19 for a particular slice or cross section of the fruit 11, the microprocessor 27 multiplies them together, to produce a measure of that cross section's area. It will be appreciated that this area measurement is proportional to the cross section's volume measurement, since the successive cross sections all have a uniform thickness or length. Finally, the microprocessor sums together the successive area measurements, to produce a digital signal proportional to the fruit's total volume.

A sorting system 63 receives on lines 65 the volume measurements produced by the microprocessor 27 for the successive items of fruit 11, and it sorts the fruit according to any desired scheme. It will be appreciated that this sorting system can alternatively include a portion of the microprocessor itself.

The apparatus can further include a display 67 for displaying counts of the number of fruit 11 measured in any given size range. The microprocessor 27 can be adapted to tabulate this information and to format appropriate signals for coupling on lines 69 to the display.

Figure 6:
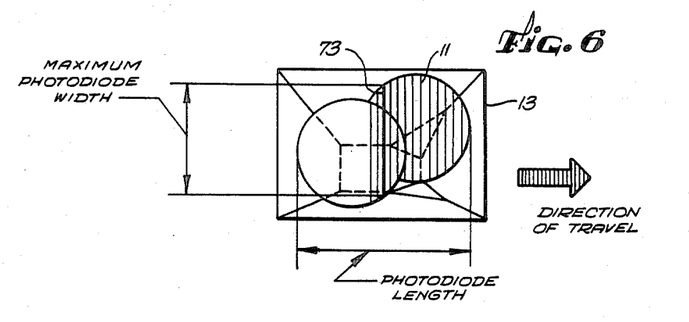
FIG. 6 is a view corresponding to that of one of the phototransducer arrays when a conveyor receptacle contains two items of fruit.

Loading apparatus (not shown) for loading fruit 11 individually in the successive receptacles 13 of the conveyor 15 can sometimes inadvertently load more than one item of fruit in any one receptacle, as shown in FIG. 6. When this occurs, the corresponding volume measurement produced by the microprocessor 27 will of course be inaccurate. It is therefore ordinarily desirable to disregard any such inaccurate volume measurements and to recirculate that fruit back to the loading apparatus, for another attempt at being placed individually in the receptacles.

In accordance with one aspect of the invention, the microprocessor 27 detects the presence of two or more fruit 11 in any one receptacle 13 by suitably processing the successive digital width measurements. In particular, it compares the maximum width measurement for the fruit in any one receptacle with the fruit's length measurement, and determines that more than one fruit is present if they differ from each other by more than a prescribed amount. When such an occurrence is detected, the microprocessor raises a flag to indicate to the sorting system 63 that the fruit should be discharged from the conveyor 15, for recirculation. This prevents the mistaken assumption that one very large item of fruit is in the receptacle, when in fact there are two or more smaller items of fruit. As a consequence, the apparatus continues to convey only those fruit whose volumes are accurately measured.

Figure 7:
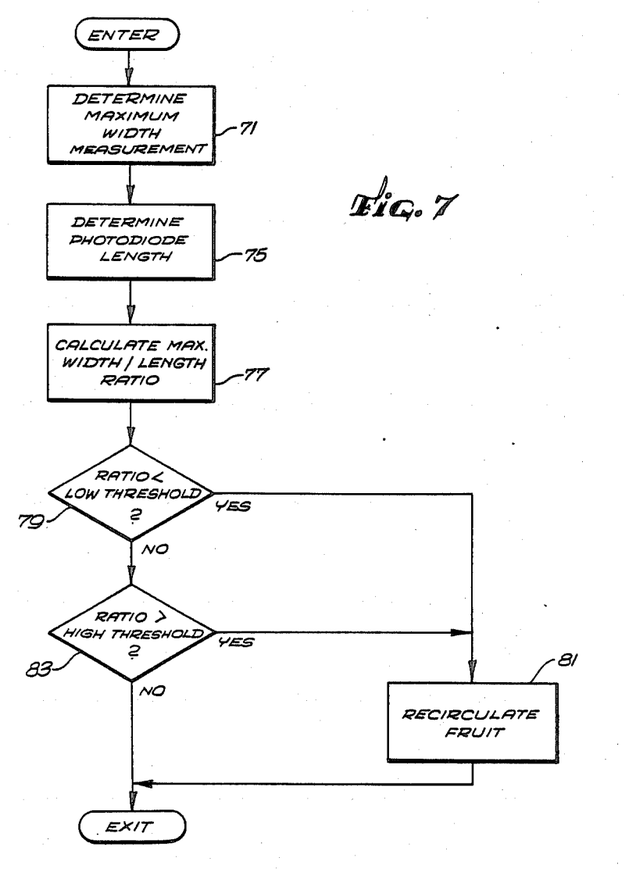
FIG. 7 is a simplified flowchart depicting the operational steps performed by the microprocessor of FIG. 5 in detecting the presence of two or more fruit in any one receptacle.

FIG. 7 is a simplified flowchart depicting the sequence of steps followed by the microprocessor 27 in detecting the presence of two or more fruit 11 in a receptacle 13. In an initial step 71, the microprocessor determines the maximum width measurement from the set of width measurements for the fruit in each receptacle. This maximum width measurement can be derived from either of the two phototransducer arrays 17 and 19. In the schematic view of FIG. 6, the maximum width measurement would result from the scan indicated by the reference numeral 73, which covers both of the two items of fruit contained in the receptacle.

Thereafter, in step 75, the microprocessor 27 determines the length of the fruit 11 in the receptacle 13. This is done by simply counting the number of different scans that cover at least a portion of the fruit. Thereafter, in step 77, the microprocessor calculates an aspect ratio for the fruit in the receptacle by dividing the maximum width measurement by the length measurement. It then compares this ratio with a predetermined low threshold in step 79. If the ratio is less than the threshold, the microprocessor deduces that more than one item of fruit is present in the receptacle and, in step 81, it couples the appropriate signals on lines 65 to the sorting system 63, to recirculate the fruit. On the other hand, if it is determined in step 79 that the aspect ratio is not less than the low threshold, the microprocessor compares the ratio to a predetermined high threshold, in step 83. If it exceeds the threshold, the microprocessor advances to the step 81 of recirculating the fruit. If, on the other hand, the ratio does not exceed the high threshold, the microprocessor deduces that just a single item of fruit is present in the receptacle, and it exits this routine.

Figure 8:
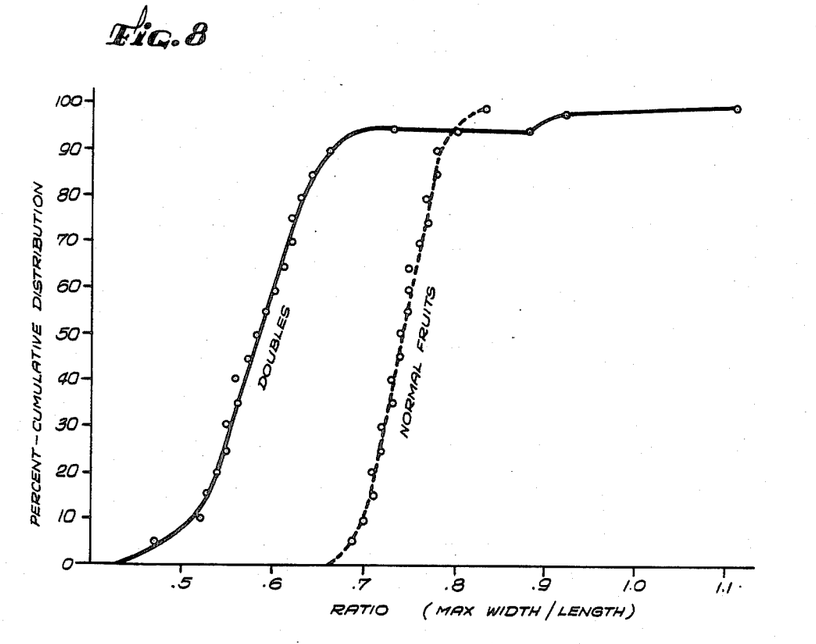
FIG. 8 is a graph of the distribution functions of the maximum width/length ratios for examples of both a single fruit in a receptacle and two fruit in a receptacle.

For normal spherical fruit, the maximum width of the fruit should closely match the fruit's length. The ratio of these two measurements should then be close to 1.0. A distribution of measured ratio values for a number of generally spherical fruit is shown in FIG. 8. It will be observed that substantially all of the measurements have ratios in the range of 0.70 to 0.80. The difference between these ratio values and the expected 1.0 value is simply due to scaling difference between the width and length measurement scales.

Also shown in FIG. 8 is the distribution of maximum width/length ratios for pairs of fruit located in the same receptacle. It will be observed that all of the test samples produced ratios in the range of about 0.50 to about 0.65 and in a narrow range around 0.90. Accordingly, the upper and lower thresholds with which the aspect ratio is compared in the microprocessor 27 are selected to be about 0.66 and 0.85. Again, the particular numbers selected depend on the particular scales used for the maximum width and length measurements.

Figure 12:
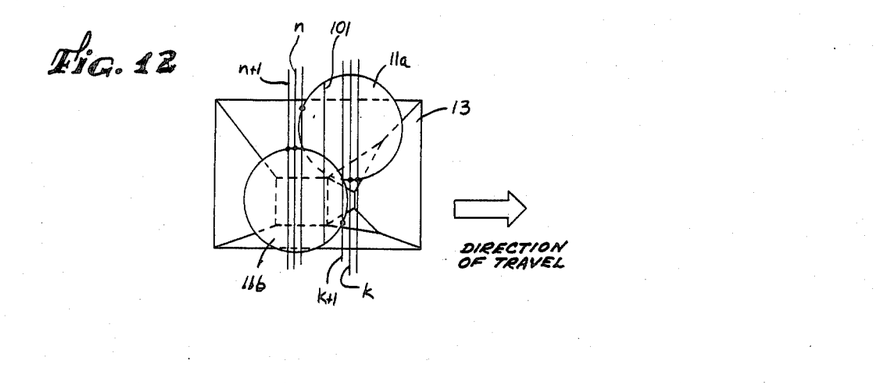
FIG. 12 is a schematic view similar to FIG. 6, but of a conveyor receptacle containing two items of fruit arranged in a more side-by-side manner.

In some instances, two items of fruit 11 can be carried in a receptacle 13 in a relative orientation where the maximum width/length ratio does not lie outside the upper and lower thresholds. One such orientation is depicted in FIG. 12, where first and second items of fruit 11a and 11b are oriented with their centers aligned at about 45 degrees relative to the conveyor's direction of travel. It will be observed that the maximum width measurement, which results from a scan identified by the reference numeral 101, is roughly equal to the length measurement. Accordingly, the procedure depicted in FIG. 7 would not detect the presence of the second fruit.

Figure 13:
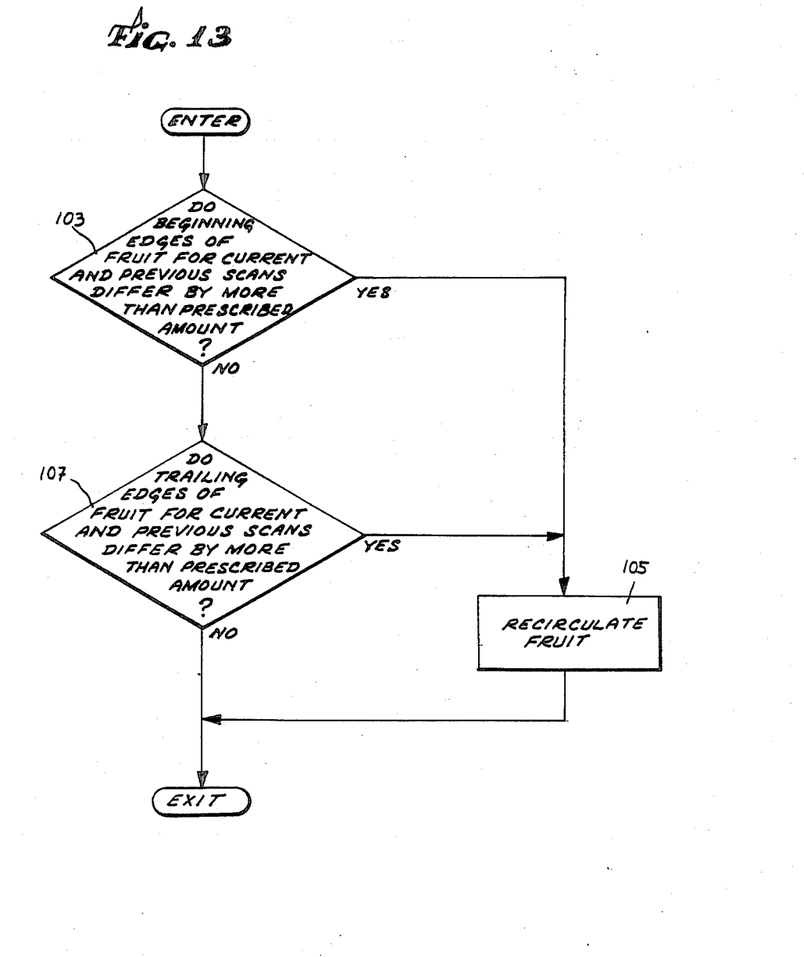
FIG. 13 is a simplified flowchart supplementing the flowchart of FIG. 7, showing the operational steps performed by the microprocessor of FIG. 5 in detecting the presence of two or more fruit in any one receptacle.

To supplement the procedure on FIG. 7, and thereby detect the presence of two or more fruit 11 in a receptacle 13 with even greater reliability, the apparatus of the invention performs an additional procedure, depicted in FIG. 13. Basically, the additional procedure examines the detected edges of the fruit in each scan and determines that more than one fruit is present if the position of a detected edge appears to change significantly in successive scans.

With reference again to FIG. 12, it will be observed that the kth scan covers only fruit 11a, while the $(k+1)^{th}$ scan covers both fruit 11a and 11b. This causes a significant jump in the position of the beginning edge of the fruit. Similarly, it will be observed that the $n^{th}$ scan covers both fruit, while the $(n+1)^{th}$ scan covers only fruit 11b. This, too, causes a significant jump in the position of the trailing edge of the fruit.

Thus, in a first step 103 of the flowchart of FIG. 13, the microprocessor 27 determines whether or not the beginning edge of the fruit 11 for the current scan differs from the beginning edge for the previous scan by more than a predetermined amount. This threshold amount can be easily selected, empirically. If the threshold amount is exceeded, the microprocessor determines that more than one item of fruit is present in the receptacle 13 and, in step 105, it couples appropriate signals on lines 65 to the sorting system 63, to recirculate the fruit.

On the other hand, if it is determined at step 103 that the beginning edges detected for the current and previous scans do not differ by more than the predetermined amount, the microprocessor 27, at step 107, performs the same test for the trailing edges detected for the current and previous scans. If the detected edges differ by more than the predetermined amount, the microprocessor proceeds to the step 105 of recirculating the fruit 11. If, on the other hand, the edges do not differ by more than the predetermined amount, the microprocessor deduces that just a single item of fruit is present in the receptacle and exits this routine.

Figure 9:
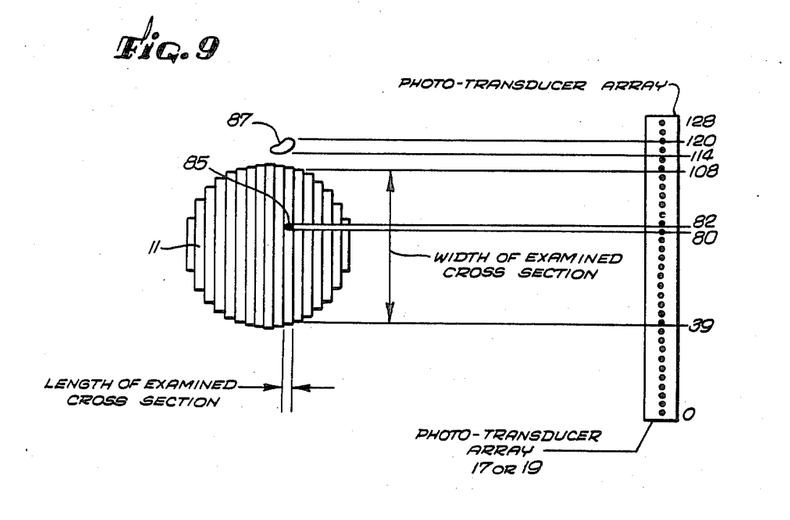
FIG. 9 is a schematic view of one phototransducer array scanning a fruit located in one of the receptacles, with a non-reflecting blemish located on the fruit's skin and with light-reflecting debris located in the receptacle adjacent to the fruit.
Figure 10:
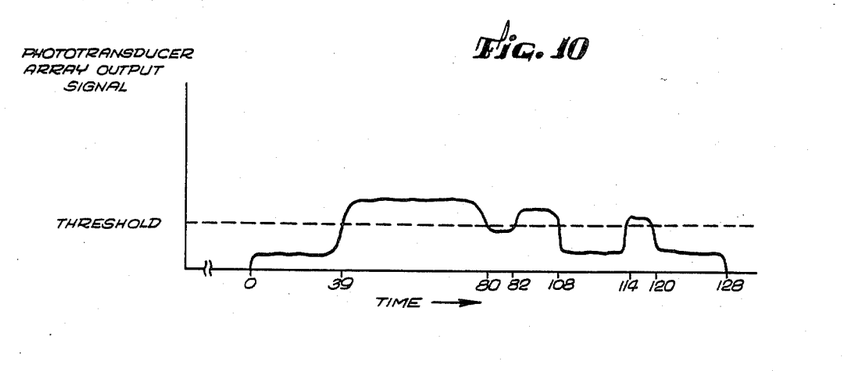
FIG. 10 is a graph of the signal produced by the phototransducer array of FIG. 9 when it scans the particular cross section of the fruit shown.

It will be appreciated that non-reflecting blemishes on the skin of the fruit 11 and light-reflecting debris located in the receptacle 13 adjacent to the fruit will affect the digitized phototransducer signals supplied to the microprocessor 27 on lines 55 and 57. In particular, a blemish of this kind will cause a portion of the signal to be in a logical zero state when it in fact corresponds to a portion of the fruit, and debris of this kind will cause a portion of the signal to be in a logical one state when in fact it should correspond to a portion of the receptacle. This is demonstrated schematically in FIGS. 9 and 10, which depict a particular scan that traverses both a non-reflecting blemish 85 and a piece of a light-reflecting debris 87. Light-reflecting debris of this kind is inevitably encountered, since the optical measuring apparatus is ordinarily used in an environment where substantial foreign material, such as pieces of fruit, stems, juice stains, ect., is present.

As previously mentioned, the microprocessor 27 measures the width of the cross section of fruit 11 in each scan by subtracting the number of the first photodiode that provides a logical one output from the number of the last photodiode that provides a logical one output. It will be appreciated that if that is done for the scan depicted in FIGS. 9 and 10, a width measurement that is too large would result. In particular, the microprocessor would mistakenly deduce that the fruit extended from photodiode number 39 to photodiode number 120. The resulting width measurement error would carry through to adversely affect the volume measurement for that particular fruit.

In accordance with another, separate aspect of the invention, the microprocessor 27 suitably processes the successive digitized phototransducer signals to provide a more accurate determination of width and thereby to detect the presence of such light-reflecting debris and, when such debris is detected, it substitutes a more-reliable width estimate. The width estimate is made based on a linear extrapolation from two previous width measurements, and the microprocessor determines that debris is present whenever the digitized phototransducer signal for a particular scan includes a logical zero portion bounded on both sides by logical one portions and the resulting photodiode width exceeds the estimated width by more than a predetermined amount, e.g., three photodiodes. This correction yields a substantially more accurate width determination.

It will be appreciated that the occurrence of a logical zero state in the digitized phototransducer signal bounded on both sides by a logical one state could also be caused by a non-reflecting blemish on the skin of the fruit 11. If a particular scan crosses such a blemish, however, the photodiode width would not ordinarily exceed the estimated width by more than the predetermined amount. Accordingly, the microprocessor 27 would use the photodiode width, and not the estimate, in its area and volume calculations.

Figure 11:
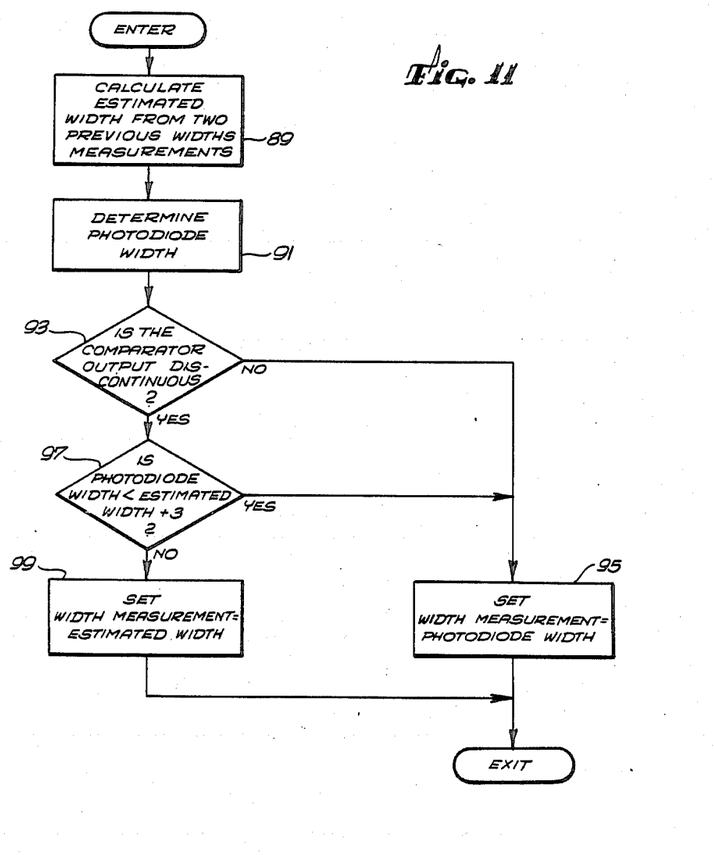
FIG. 11 is s simplified flowchart showing the operational steps performed by the microprocessor of FIG. 5 in detecting and correcting for the presence of non-reflecting blemishes on the fruit's skin and for light-reflecting debris in the receptacle adjacent to the fruit.

FIG. 11 depicts a simplified flowchart of the sequential steps the microprocessor 27 follows in eliminating the undesired effect that light-reflecting debris has on the successive width measurements and thus the fruit's overall volume measurement. In an initial step 89, the microprocessor produces an expected or estimated width measurement for each scan, based on previous width measurements. The estimage is preferably based on a linear extrapolation of the two preceding width measurements from the same phototransducer array 17 or 19. Such an extrapolation can be produced by subtracting the second previous width measurement from two times the immediately previous width measurement. Since the successive fruit cross sections are relatively narrow, e.g., 0.045 inches, there should be little variation in the actual widths of adjacent cross sections, and a linear extrapolation is therefore considered to be sufficiently accurate.

Thereafter, in step 91, the microprocessor 27 determines the photodiode width for the current scan by subtracting the number of the first photodiode in the logical one state from the number of the last photodiode in the logical one state. It then determines, at step 93, whether or not there is any discontinuity between these first and last photodiode numbers, i.e., whether or not there are any intervening periods in which the digitized signal is in the logical zero state. If not, it is deduced that the current scan has not encountered either a non-reflecting blemish or any light-reflecting debris, and the microprocessor proceeds to step 95 where it sets the width measurement for this scan equal to the photodiode width measurement, i.e., the subtraction answer. It then exits this routine.

If, on the other hand, the microprocessor 27 determines in step 93 that the digitized phototransducer signal does include an intervening discontinuity for the present scan, it proceeds to step 97 where it compares the actual width measurement determined in step 91 with the width estimate determined in step 89. If the photodiode width is less than, or no more than a prescribed amount greater than, the estimate, it is deduced that the discontinuity is due to a non-reflecting blemish and the microprocessor proceeds to the step 95, where it sets the width measurement equal to the photodiode width. If, on the other hand, it is determined that the photodiode width exceeds the estimatedd width by more than the prescribed amount, the microprocessor deduces that light-reflecting debris has been encountered and, at step 99, it sets the width measurement equal to the estimated width. Thereafter, it exits this routine.

Not shown specifically in the drawings, the microprocessor 27 can further process the successive digitized scan signals supplied to it on lines 35 and 37 to detect the failure of any of the lamps 21. In particular, at least one of the photodiodes of the two phototransducer arrays 17 and 19 is oriented to view a white strip painted on at least one of the receptacles 13. The microprocessor deduces that a lamp failure has occurred if the signal output by the photodiode ever drops below the predetermined threshold voltage produced by the voltage source 51.

It should be appreciated from the foregoing description that the present invention provides an improved optical measuring apparatus for measuring the volume of a succession of individual, generally spherical fruit, even in the presence of light-reflecting debris adjacent to the fruit. The apparatus automatically measures volume with a high degree of accuracy, and is substantially less expensive than conventional mechanical fruit sizers.

Although the invention has been described in detail with reference to the presently-preferred embodiment, it will be understood by those of ordinary skill in the art that various modifications can be made without departing from the invention. Accordingly, the invention is limited only by the following claims.

I claim:

1. Optical measuring apparatus for measuring the volume of a generally spherical fruit located in a receptacle and for determining if the receptacle contains more than one fruit, wherein the apparatus comprises:

width measuring means for measuring the width of a pluralith of narrow, substantially parallel cross sections of the fruit in the receptacle, to produce a set of width measurements;

volume calculating means for calculating the area of each narrow cross section of the fruit based on the corresponding width measurement, and for summing together the calculated areas to produce a measure of the volume of the fruit;

selecting means for selecting the largest width measurement from the set of width measurements;

length measuring means for measuring the length of the fruit in the receptacle by counting the plurality of cross sections; and ratio means for calculating the ratio of the largest width measurement and the length measurement and for comparing the ratio with one or more predetermined thresholds, to determine if more than one fruit is located in the receptacle.

2. Optical measuring apparatus as defined in claim 1, wherein the width measuring means comprises:

phototransducer means for sensing light received from an examining region;

conveyor means for moving the receptacle and the fruit located in it through the examining region;

means for illuminating the examining region as the conveyor means moves the receptacle and fruit through it; and reading means for sequentially reading the phototransducer means at regular intervals of time, as the conveyor means moves the receptacle and fruit through the examining region, to produce the set of width measurements.

3. Optical measuring apparatus as defined in claim 2, wherein:

the phototransducer means includes a linear array of photodiodes arranged to have non-overlapping, contiguous fields of view of the examining region; and the reading means sequentially determines the number of photodiodes in the linear array that view a portion of the fruit located in the receptacle, to produce the set of width measurements.

4. Optical measuring apparatus as defined in claim 2, wherein:

the width measuring means further includes at least one additional phototransducer means for sensing light received from the examining region in a direction substantially coplanar with the direction to the first phototransducer means;

the reading means sequentially reads the second phototransducer means at regular intervals of time, to produce a second set of width measurements; and the volume calculating means multiplies each measurement in the first set of width measurements with the corresponding measurement in the second set of width measurements, to calculate the area of each of the narrow cross sections of the fruit.

5. Optical measuring apparatus as defined in claim 4, wherein the selecting means selects the largest width measurement from either the first and second sets of width measurements.

6. Optical measuring apparatus as defined in claim 4, wherein the width measuring means includes just two phototransducers, arranged to view the examining region along substantially orthogonal axes.

7. Optical measuring apparatus as defined in claim 1, wherein each of the narrow cross sections of the fruit has substantially the same length.

8. Optical measuring apparatus as defined in claim 1, wherein the ratio means compares the calculated ratio with both a predetermined upper threshold and a predetermined lower threshold and determines that more than one fruit is located in the receptacle if the ratio exceeds the upper threshold or does not exceed the lower threshold.

9. Optical measuring apparatus as defined in claim 1, and further including means for comparing each width measurement in the set of width measurements with the width measurement for an adjacent cross section of the article or articles in the receptacle and for determining that more than one article is located in the receptacle if any of the compared measurements differ from each other by more than a predetermined amount.

10. Optical measuring apparatus for measuring the volume of a succession of individual, generally spherical fruit, each located in a separate receptacle, the apparatus comprising:

conveyor means for moving the individual receptacles and fruit in sequence through an examining region;

means for illuminating the examining region as the conveyor means moves the fruit through it;

first and second linear arrays of phototransducers arranged in a coplanar relationship substantially perpendicular to the direction of movement of the conveyor means and oriented to receive light reflected from the examining region along substantially orthogonal axes;

means for reading the first and second arrays of phototransducers at regular intervals of time, as the conveyor means moves the fruit sequentially through the examining region, and for determining the number of phototransducers in each array that view a portion of fruit then within the array's field of view, to produce a plurality of pairs of width measurements for each fruit, each pair corresponding to a separate narrow cross section of the fruit;

means for multiplying together each pair of width measurements, to produce a measure of the area of the corresponding narrow cross section of the fruit, and for summing together the area measurements, to produce a measure of the volume of the fruit;

means for selecting the largest width measuement derived by the reading means from either of the first and second arrays of phototransducers;

means for counting the number of narrow cross sections for each fruit, to produce a measure of the fruit's length;

means for calculating the ratio of the largest width measurement and the length measurement for each fruit; and means for comparing the calculated ratio with both a predetermined upper threshold and a predetermined lower threshold, to determine if more than one item of fruit is located in any individual receptacle, the comparing means generating a recirculate signal if the ratio does not lie between the two thresholds.

11. A method for measuring the volume of a generally spherical fruit located in a receptacle and for determining if the receptacle contains more than one fruit, comprising steps of:

measuring the width of a plurality of narrow, substantially parallel cross sections of the fruit in the receptacle, to produce a set of width measurements;

calculating the area of each cross section of the fruit using the set of width measurements;

summing together the calculated areas of the plurality of cross sections, to produce a measure of the volume of the fruit;

selecting the largest width measurement from the set of width measurements;

measuring the length of the fruit in the receptacle by counting the plurality of cross sections;

calculating the ratio of the largest width measurement and the length measurement; and comparing the ratio with one or more predetermined thresholds, to determine if more than one fruit is located in the receptacle.

12. A method as defined in claim 11, wherein the step of measuring the width includes steps of:

sensing light received from an examining region using phototransducer means;

moving the receptacle and the fruit located in it through the examining region;

illuminating the examining region as the receptacle and fruit are moved through it; and sequentially reading the phototransducer means at regular intervals of time, as the receptacle and fruit are moved through the examining region, to produce the set of width measurements.

13. A method as defined in claim 2, wherein:

the phototransducer means used in the step of sensing includes a linear array of photodiodes arranged to have non-overlapping, contiguous fields of view of the examining region; and the step of reading sequentially determines the number of photodiodes in the linear array that view a portion of the fruit located in the receptacle, to produce the set of width measurements.

14. A method as defined in claim 12, wherein:

the step of measuring the width further includes a step of sensing light received from the examining region in a direction substantially coplanar and orthogonal with the direction to the first phototransducer means, this second step of sensing being performed using second phototransducer means;

the step of reading sequentially reads the second phototransducer means at regular intervals of time, to produce a second set of width measurements; and the step of calculating the area includes a step of multiplying each measurement in the first set of width measurements with the corresponding measurement in the second set of width measurements, to calculate the area of each of the narrow cross sections of the fruit.

15. A method as defined in claim 14, wherein the step of selecting includes a step of selecting the largest width measurement from either of the first and second sets of width measurements.

16. A method as defined in claim 12, wherein:
the step of moving moves the receptacle and the fruit located in it at a substantially uniform rate; and
the step of sequentially reading is periodic, such that the plurality of cross sections of the fruit have substantially the same lengths.

17. A method as defined in claim 11, wherein the step of comparing comares the calculated ratio with both a predetermined upper threshold and a predetermined lower threshold and determines that more than one fruit is located in the receptacle if the ratio exceeds the upper threshold or does not exceed the lower threshold.

18. A method as defined in claim 11, and further including a step of comparing each width measurement in the set of width measurements with the width measurement for an adjacent cross section of the article or articles in the receptacle and determining that more than one article is located in the receptacle if any of the compared measurements differ from each other by more than a predetermined amount.

19. Optical measuring apparatus for measuring the volume of a generally spherical fruit located in a receptacle, despite the presence of light-reflecting debris in the receptacle adjacent ot the fruit, the aparatus comprising:
means for scanning the receptacle and the fruit located in it along a plurality of narrow, substantially parallel paths, to produce a set of scan signals, each scan signal representing a separate narrow cross section of the fruit and any light-reflecting debris located in the receptacle adjacent to the fruit;
width detection means responsive to the set of scan signals for detecting the presence of any light-reflecting debris adjacent to the fruit and for producing a set of width measurements, each measurement representing the width of a separate cross section of the fruit; and
volume calculating means responsive to the set of width measurements for calculating the volume of the fruit, wherein the volume calculation is substantially unaffected by any light-reflecting debris located in the receptacle adjacent to the fruit.

20. Optical measuring apparatus as defined in claim 19, wherein the scanning means includes:
conveyor means for moving the receptacle, and the fruit located in it, through an examining region;
a linear array of phototransducers oriented substantially perpendicular to the direction of movement of the conveyor means, the phototransducers adapted to have non-overlapping, contiguous fields of view of the examining region and to produce signals proportional to the intensity of any light incident on them;
means for illuminating the examining region as the conveyor means moves the receptacle and fruit through it; and reading means for serially reading out the signals produced by the separate phototransducers at regular intervals of time, as the conveyor means moves the receptacle and fruit through the examining region, to produce the set of scan signals.

21. Optical measuring apparatus as defined in claim 20, wherein:
the scanning means further includes at least one additional linear array of phototransducers oriented substantially coplanar with the first linear array and perpendicular to the direction of movement of the conveyor means;
the reading means serially reads out the signals produced by the phototransducers of the additional linear array, at intervals of time corresponding to those for the first linear array, to produce a second set of scan signals;
the width detection means is further responsive to the second set of scan signals to detect the presence of any light-reflecting debris adjacent to the fruit and produce a second set of width measurements, each representing the width of a separate one of the cross sections of the fruit, taken along an axis different from that of the first set of width measurements; and
the volume calculating means calculates the volume of the fruit based on both the first and the second sets of width measurements.

22. Optical measuring apparatus as defined in claim 21, wherein the scanning means includes just two linear arrays of phototransducers, and the two arrays are oriented to view the examining region along substantially orthogonal axes.

23. Optical measuring apparatus as defined in claim 19, wherein the width detection means includes:
means for comparing each scan signal with a predetermined threshold signal, to produce a digitized scan signal that is in logical one state whenever the scanning means scans a light-reflecting portion of the fruit or any light-reflecting debris located adjacent to the fruit and that is in a logical state otherwise; and
means for measuring the time duration from the moment each digitized scan signal first enters the logical one state until the moment it last leaves the logical one state, to produce a width measurement.

24. Optical measuring apparatus as defined in claim 23, wherein the width detection means further includes:
means for detecting any logical zero portion in each of the digitized scan signals preceded and followed by logical one portions, wherein such logical zero portions represent either a non-reflecting blemish on the fruit or a space between the fruit and light-reflecting debris;
means for generating a width estimate based on at least one neighboring width measurement;
means for comparing the width measurement with the width estimate and determining that the width measurement is based in part on light-reflecting debris if it exceeds the width estimage by more than a predetermined amount; and
means for substituting the width estimate for the width measurement whenever the comparing means determines that the width measurement is based in part on light-reflecting debris.

25. Optical measuring apparatus as defined in claim 24, wherein the generating means generates the width estimate based on a linear extrapolation from the two immediately previous width measurements.

26. Optical measuring apparatus as defined in claim 19, wherein the width measurement produced by the width detection means when it detects the presence of light-reflecting debris adjacent to the fruit is a width estimate based on at least one neighboring width measurement.

27. Optical measuring apparatus as defined in claim 26, wherein the width estimate used in the width detection means is based on a linear extrapolation from the two immediately previous width measurements.

28. Optical measuring apparatus for measuring the volume of a succession of individual, generally spherical fruit, each located in a separate receptacle, the apparatus comprising:
conveyor means for moving the individual receptacles and fruit in sequence through an examining region;
means for illuminating the examining region as the conveyor means moves the fruit through it;
first and second linear arrays of phototransducers arranged in a coplanar relationship substantially perpendicular to the direction of movement of the conveyor means and oriented to receive light reflected from the examining region along substantially orthogonal axes, the phototransducers adapted to have non-overlapping, contiguous fields of view of the examining region and to produce signals proportional to the intensity of any light incident on them;
reading means for serially reading out the signals produced by the separate phototransducers of the first and second linear arrays at regular intervals of time, as the conveyor means moves the receptacles and fruit through the examining region, to produce a plurality of pairs of scan signals, each pair of scan signals representing a separate narrow cross section of the fruit and any light-reflecting debris located in the receptacle adjacent to the fruit;
width detection means responsive to the plurality of pairs of scan signals for each fruit, for detecting the presence of any light-reflecting debris adjacent to the fruit and for producing a plurality of pairs of width measurements, each measurement pair representing a separate narrow cross section of the fruit; and
volume calculating means responsive to the plurality of pairs of width measurements, for calculating the volume of each fruit, wherein the volume calculation is substantially unaffected by any lightreflecting debris located in the receptacle adjacent to the fruit;
wherein the width detection means includes
means for comparing each scan signal with a predetermined threshold signal, to produce a digitized scan signal that is i a logical one state whenever the corresponding linear array received light from a light-reflecting portion of the fruit or any light-reflecting debris located adjacent to the fruit and that is in a logical zero state otherwise,
means for measuring the time duration from the moment each digitized scan signal first enters the logical one state until the moment it last leaves the logical one state, to produce a width measurement,
means for detecting any logical zero portion in each of the digitized scan signals preceded and followed by logical one portions, wherein such logical zero portions represent either a non-reflecting blemish on the fruit or a space between the fruit and light-reflecting debris,
means for generating a width estimate based on a linear extrapolation from the two immediately previous width measurements,
means for comparing the width measurement with the width estimate and determining that the width measurement is based in part on light-reflecting debris if it exceeds the width estimate by more than a predetermined amount, and
means for substituting the width estimate for the width measurement whenever the comparing means determines that the width measurement is based in part on light-reflecting debris.

29. A method for measuring the volume of a generally spherical fruit located in a receptacle, despite the presence of light-reflecting debris in the receptacle adjacent to the fruit, the method comprising steps of:
scanning the receptacle and the fruit located in it along a plurality of narrow, substantially parallel paths, to produce a set of scan signals, each scan signal representing a separate narrow cross section of the fruit and any light-reflecting debris located in the receptacle adjacent to the fruit;
processing the set of scan signals to detect the presence of any light-reflecting debris adjacent to the fruit and to produce a set of width measurements, each measurement representing the width of a separate cross section of the fruit; and
calculating the volume of the fruit based on the set of width measurements, wherein the volume calculation is substantially unaffected by any light-reflecting debris located in the receptacle adjacent to the fruit.

30. A method as defined in claim 29, wherein the step of scanning includes steps of:
moving the rceptacle, and the fruit located in it, through a examining region;
producing the set of scan signals using a linear array of phototransducers oriented substantially perpendicular to the direction in which the step of moving moves the receptacle and fruit, the phototransducers adapted to have non-overlapping, contiguous fields of view of the examining region and to produce signals proportional to the intensity of any light incident on them;
illuminating the examining region as the steps of moving moves the receptacle and fruit through it; and
serially reading out the signals produced by the separate phototransducers at regular intervals of time, as the step of moving moves the receptacle and fruit through the examining region, to produce the set of scan signals.

31. A method as defined in claim 30, wherein:
the step of producing further uses at least one additional linear array of phototransducers oriented substantially coplanar with the first array and perpendicular to the direction in which the step of moving moves the receptacle and fruit;
the step of serially reading serially reads out the signals produced by the phototransducers of the additional linear array, at intervals of time corresponding to those for the first linear array, to produce a second set of scan signals;
the step of processing further processes the second set of scan signals to detect the presence of any lightreflecting debris adjacent to the fruit and produce a second set of width measurements, each representing the width of a separate one of the cross sections of the fruit, taken along an axis different from that of the first set of width measurements; and the step of calculating calculates the volume of the fruit based on both the first and the second sets of width measurements.

32. A method as defined in claim 31, wherein the step of scanning uses just two linear arrays of phototransducers, and the two arrays are oriented to view the examining region along substantially orthogonal axes.

33. A method as defined in claim 29, wherein the steps of processing includes steps of:

comparing the scan signal with a predetermined threshold signal, to produce a digitized scan signal that is in a logical one state whenever the step of scanning scans a light-reflecting portion of the fruit or any light-reflecting debris located adjacent to the fruit and that is in a logical zero state otherwise; and measuring the time duration from the moment each digitized scan signal first enters the logical one state until the moment it last leaves the logical one state, to produce a width measurement.

34. A method as defined in claim 33 wherein the steps of processing further includes steps of:

detecting any logical zero portion in each of the digitized scan signals preceded and followed by logical one portions, wherein such logical zero portions represent either a non-reflecting blemish on the fruit or a space between the fruit and light-reflecting debris;

generating a width estimate based on at least one neighboring width measurement;

comparing the width measurement with the width estimate and determining that the width measurement is based in part on light-reflecting debris if it exceeds the width estimate by more than a predetermined amount; and substituting the width estimate for the width measurement whenever the step of comparing determines that the width measurement is based in part on light-reflecting debris.

35. A method as defined in claim 34, wherein the steps of generating generates the width estimate based on a linear extrapolation from the two immediately previous width measurements.

36. A method as defined in claim 29, wherein the width measurement produced in the step of processing, whenever it detects the presence of light-reflecting debris adjacent to the fruit is a width estimate based on at least one neighboring width measurement.

37. A method as defined in claim 36, wherein the width estimate used in the step of processing is based on a linear extrapolation from the two immediately previous width measurements.

38. In an optical measuring system for measuring the volume of a generally spherical article located in a receptacle, apparatus for determining if the receptacle contains more than one article, comprising:

measuring means for measuring the width of a plurality of narrow, substantially parallel cross sections of the article or articles in the receptacle, to produce a set of width measurements, and for calculating the volume of the article or articles based on the set of width measurements;

selecting means for selecting the largest width measurement from the set of width measurements;

length measuring means for measuring the length of the article or articles in the receptacle;

ratio means for calculating the ratio of the largest width measurement and the length measurement and for comparing the ratio with one or more predetermined thresholds, to determine if more than one article is located in the receptacle; and means for comparing each width measurement in the set of width measurements with the width measurement for an adjacent cross section of the article or articles in the receptacle and for determining that more than one article is located in the receptacle if any of the compared measurements differ from each other by more than a predetermined amount.

* * * * *

UNITED STATES PATENT AND TRADEMARK OFFICE
CERTIFICATE OF CORRECTION

PATENT NO. : 4,693,607
DATED : September 15, 1987
INVENTOR(S) : Tim D. Conway

It is certified that error appears in the above-identified patent and that said Letters Patent is hereby corrected as shown below:

IN THE SPECIFICATION:

At column 1, line 51, change "voluem" to -- volume --.
At column 9, line 14, change "estimage" to -- estimate --.

IN THE CLAIMS:

In claim 13, at column 12, line 51, change "2" to -- 12 --.
In claim 17, at column 13, line 20, change "comares" to -- compares --.
In claim 23, at column 14, line 42, insert -- zero -- before "state".
In claim 28, at column 15, line 57, change "i" to -- in --.
In claim 30, at column 16, line 49, change "steps" to -- step --.
In claim 35, at column 18, line 4, change "steps" to -- step --.

Signed and Sealed this

Fifth Day of April, 1988

Attest:

DONALD J. QUIGG

*Attesting Officer*

*Commissioner of Patents and Trademarks*